United States Patent [19]

Staar

[11] 4,045,820
[45] Aug. 30, 1977

[54] DEVICE FOR POSITIONING AND GUIDING A MAGNETIC TAPE AROUND THE DRUM OF A ROTARY HEAD ASSEMBLY

[75] Inventor: Theophiel Clement Jozef Lodewijk Staar, Kraainem, Belgium

[73] Assignee: Staar, S.A., Brussels, Belgium

[21] Appl. No.: 600,091

[22] Filed: July 29, 1975

[30] Foreign Application Priority Data

Aug. 5, 1974 France .................................. 74.27182

[51] Int. Cl.² .............................................. G11B 15/66
[52] U.S. Cl. ..................................................... 360/85
[58] Field of Search ............................ 360/85, 130, 84

[56] References Cited

U.S. PATENT DOCUMENTS

| | | | |
|---|---|---|---|
| 3,673,348 | 6/1972 | Larkin | 360/85 |
| 3,770,904 | 11/1973 | Kihara | 360/85 |

*Primary Examiner*—Robert S. Tupper
*Attorney, Agent, or Firm*—Leydig, Voit, Osann, Mayer & Holt, Ltd.

[57] ABSTRACT

Apparatus for positioning and guiding magnetic tape around the drum of a rotary head assembly in a recording and/or reproducing mechanism, particularly for video tapes. At least two guide fingers guide the magnetic tape from a cartridge around at least a portion of the surface of the drum of the rotary head assembly. These guide fingers are mounted for movement between a retracted position where the fingers engage the magnetic tape in a cartridge, and an advanced position where the guide fingers dispose the tape along a predetermined helical path on the drum surface. A self-locking mechanism is provided for holding the guide fingers in the advanced position against the normal retracting forces exerted on the fingers by the tape moving thereover, while permitting limited retracting movement of the fingers in response to excessive retracting forces exerted on the fingers during abnormal tape movement. The self-locking feature is provided by a coupling mechanism which interconnects a pair of drive wheels with the guide fingers. The coupling mechanism includes a connecting rod pivoted to one of the drive wheels so that a half revolution of the drive wheel in a first direction advances the connecting rod to move the corresponding guide finger to its advanced position, and a half revolution of the drive wheel in the opposite direction retracts the connecting rod to move the corresponding guide finger to its retracted position. Stop means associated with each drive wheel stop rotation of the wheel in the first direction slightly beyond the point of maximum advancement of the connecting rod so that any retracting forces exerted on the connecting rod by the guide finger are resisted by the stop means, thereby providing self-locking of the guide fingers. Retracting movement of the guide fingers in response to excessive retracting forces produced by abnormal tape movement is provided by a biased lost motion connection between each connecting rod and the corresponding guide finger. This lost motion connection permits limited retracting movement of the guide fingers in response to retracting forces exerted on the guide fingers in excess of the bias on the lost motion connection.

8 Claims, 7 Drawing Figures

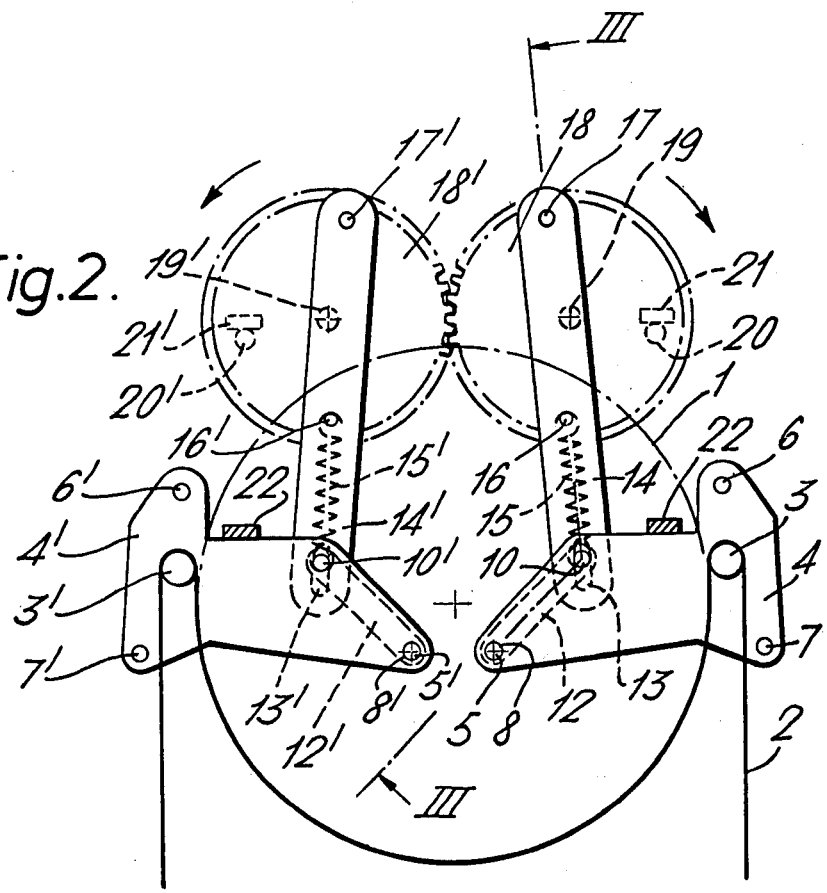
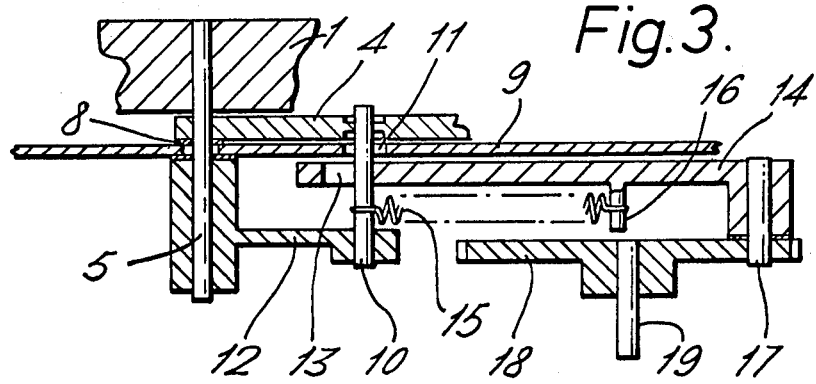

DEVICE FOR POSITIONING AND GUIDING A MAGNETIC TAPE AROUND THE DRUM OF A ROTARY HEAD ASSEMBLY

DESCRIPTION OF THE INVENTION

The invention relates to a device for winding and guiding a magnetic tape around a drum of a rotary head assembly in an apparatus for recording and/or reproducing information on the magnetic tape, particularly in a video tape recorder adapted to receive a self-contained tape cartridges.

In this type of apparatus, an information carrier in the form of a magnetic tape is wound in a helical path around a tape guide drum including one or more rotary video heads which interact with the magnetic tape for the recording and/or playback of video signals. These video signals are typically recorded long tracks which are parallel to each other and oblique relative to the longitudinal axis of the tape. Since the tape is wrapped around the drum helically, these video signal tracks lie in planes perpendicular to the axis of the drum when the tape is wound around the drum. As the tape moves around the drum, the video signal tracks are successively scanned by the rotating video head or heads. The rotational speed of these video heads and the speed at which the tape moves are coordinated in such a way that each of the signal tracks is accurately scanned over its entire length by each head. It is thus obvious that the magnetic tape must be positioned on the drum with a high degree of accuracy, so that the tracks will be precisely aligned with the rotary heads. The tape must also be positioned and guided around the drum in such a way that the tape will always occupy the same position in relation to the rotary head assembly and that the length of tape in contact with the drum will remain constant. These requirements are all the more critical in view of the fact that the width of the tracks is of the order of only a tenth of a millimeter and adjacent tracks are spaced only a few hundredths of a millimeter apart.

The devices for guiding and positioning the magnetic tape must not only meet the foregoing requirements, but also must be sufficiently rigid to stand up to the forces exerted on the guiding and positioning devices by the magnetic tape during the normal operation of the apparatus, in order not to transmit vibrations to the tape; such vibrations can have disastrous effects on the quality of the recorded image. To avoid breaking the tape, the guiding devices must also yield under the effect of any abnormal forces exerted by the tape, such as may occur at the end of a tape winding or rapid re-winding operation when the supply reel is not braked in the correct manner.

French Pat. No. 2,114,740 discloses a device by which a magnetic tape stored in a cartridge is wound around the drum of a rotary head assembly by guide fingers affixed to a rotating support. The support can be pivoted between two positions by means of a displacement device; when the support occupies a first position a magnetic tape is engaged by the guide fingers, and when it moves to a second position, i.e. the operative position, the magnetic tape is wound around the drum in a helical path forming an omega-shaped loop. The support is held by the aid of a stop in its second position, by the traction exerted by a resilient device incorporated in the position adjusting means for the support, in such a way that the support is able to yield under the effect of any abnormal force exerted by the tape on the guide fingers but will be immediately restored to its operative position by the resilient device when the abnormal force is removed. When the tape is in the operative position, a lever fitted with a hook drops into a slot provided in a driving pulley for the support displacement system and simultaneously actuates a switch, in order to stop the movement of the support. As the shape of this slot enables the lever to be automatically withdrawn when the pulley is rotating in the reverse direction, in order to restore the support to its original position, the second position is not "locked", i.e., the rotation of the pulley causes the lever to emerge from the slot.

These known devices, comprising a guide finger support rotating together with the drum, also suffer from the drawback of comparatively great inertia, besides proving cumbersome, as the space available around the drum has to be reserved for this support.

In an article by R. D. Johnson et al., "Automatic tape threading", published in "IBM Technical Disclosures Bulletin", Vol. 8, No. 8, Jan. 1967, p. 968, a device was proposed for forming a loop around a drum by means of guide fingers affixed to the ends of lever arms pivoting about a shaft. Because these lever arms are relatively long, the magnetic tape is not guided in a very stable or accurate manner. Furthermore, this device lacks means for locking the lever arms in their operative position.

The purpose of the present invention is to provide a device for winding and guiding a magnetic tape around a drum of a rotary recording and/or reproducing head assembly designed on simple and space-saving lines, enabling the tape to be accurately positioned around the drum, ensuring that the tape will move in a stable manner without any vibration of the tape, and enabling the tape to be released in the event of faulty operation.

According to the present invention there is provided apparatus for positioning and guiding magnetic tape around the drum of a rotary head assembly in a recording and/or reproducing mechanism having at least two guide fingers for guiding the magnetic tape and mounted for movement between a retracted position where the guide fingers engage the magnetic tape in a self-contained cartridge, and an advanced position where the guide fingers dispose the tape along a predetermined helical path on the drum surface, the improvement comprising self-locking means for holding the guide fingers in the advanced position against normal retracting forces exerted on said fingers by the tape moving thereover, and means for permitting limited retracting movement of said fingers in response to excessive retracting forces exerted on said fingers during abnormal tape movement.

To enable the invention to be clearly understood, an embodiment will be described by way of example with reference to the accompanying drawings, wherein:

FIG. 2 is the same plan view shown in FIG. 1, with the guide fingers in their advanced positions;

FIG. 3 is a section along the line III—III in FIG. 2;

In order not to encumber the diagrams with excessive detail, only those items are shown which are needed for an understanding of the invention.

Figure 1:
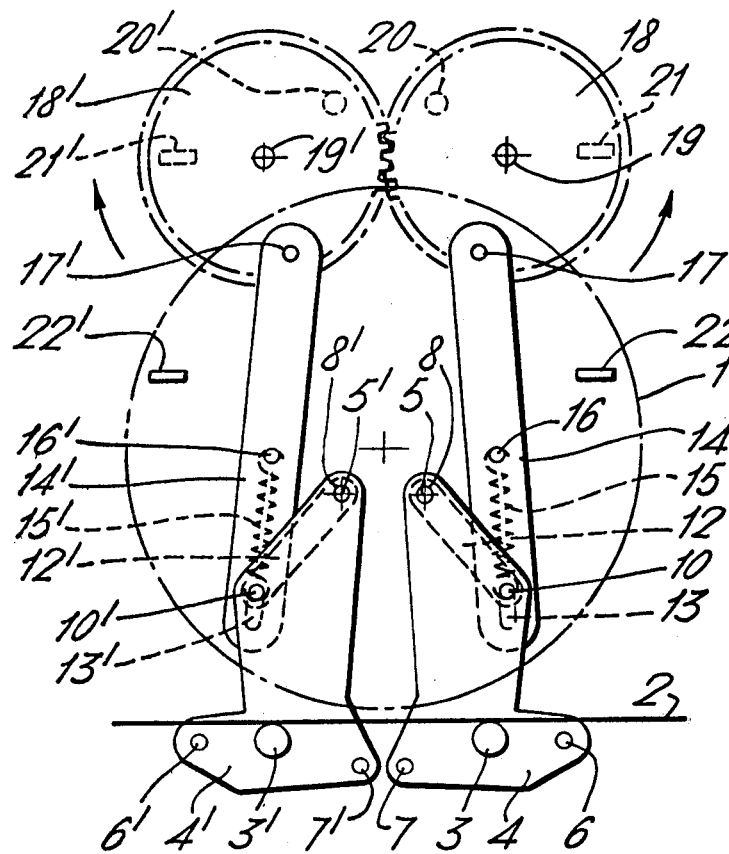
FIG. 1 is a plan view of a tape guiding system embodying the present invention, with the guide fingers in their retracted position.
Figure 1A:
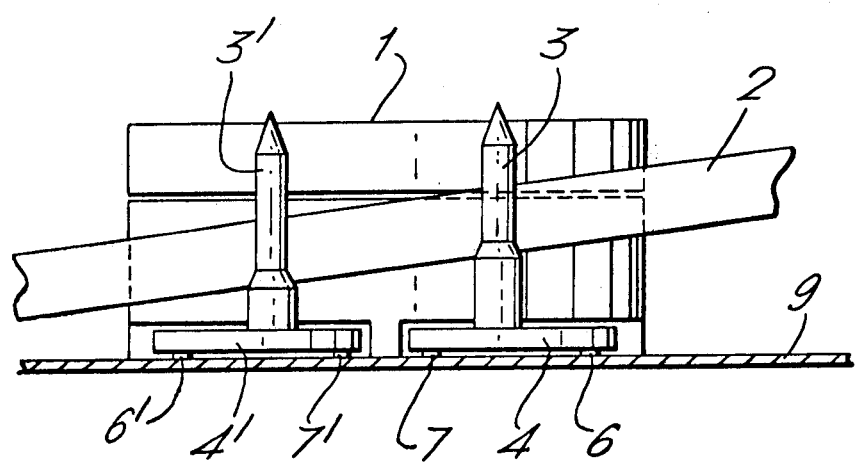
FIG. 1a is a front elevation of the system of FIG. 1.
Figure 4:
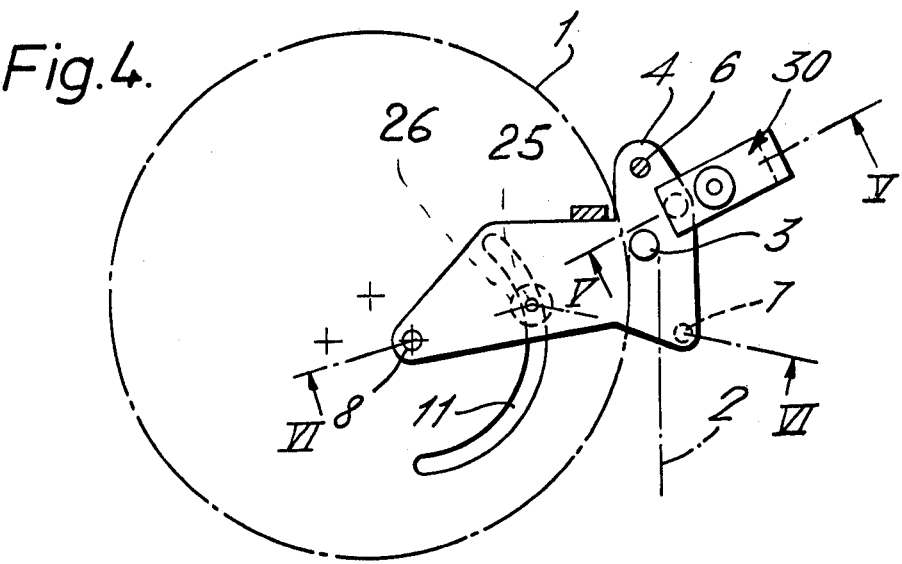
FIG. 4 is a more detailed plan of the support and transfer mechanism for one of the guide fingers in the device of FIG. 1.

FIGS. 1, 1a, 2 and 3 show a device for forming a loop of magnetic tape around a drum 1. In order to illustrate the various elements more clearly, the drum in FIGS. 1, 2 and 4 is only shown in contour. The tape loop is omega-shaped, i.e. the contact between the drum and the tape 2 covers an arc of 180°, as is generally required in playback and recording devices in which the drum contains two magnetic heads mounted at diametrically opposite points in the drum. The two ends of the magnetic tape are affixed respectively to the core of a supply reel and the core of a take-up reel, the reels being stored in superposed relationship in a cartridge not shown in the drawings. This cartridge is inserted in a housing which can pivot together with the cartridge about a shaft, in such a way that part of the magnetic tape 2 which is situated between the two reels is engaged by the guide fingers 3, 3' as shown in FIGS. 1 and 1a.

The guide fingers 3, 3' are affixed to flat supports, 4, 4', respectively, positioned underneath the drum. As the driving elements for the guide fingers 3, 3' are duplicated and identical, only the elements relating to the guide finger 3 will be described. The corresponding elements relating to the guide finger 3' have the same reference numbers supplemented by a prime.

The support 4, which rests on a frame 9 (FIGS. 1a and 3) of the recording and playback apparatus, is integral with driving means situated underneath the frame 9, so as to be displaceable from a retracted position shown in FIG. 1 to an advanced position shown in FIG. 2. This displacement of the support 4 is effected by pivoting the support about a fixed shaft 5 passing downwardly through the frame 9 and upwardly into the drum 1. The support 4 is integral with a driving stem 10 which slides in a circular groove segment 11 (see also FIG. 4) provided in the frame 9. The stem 10 and the shaft 5 are interconnected, below the frame 9, by a lever arm 12, as shown most clearly in FIG. 3. Between the frame 9 and the lever arm 12, the stem 10 extends through a slot 13 in a connecting rod 14, likewise situated underneath the frame 9, and is connected via a tension spring 15 to a pin 16 of this connecting rod 14. Thus, it can be seen that the connecting rod 14, the arm 12 and the support 4 form a coupling means interconnecting the drive wheel 8 and the guide finger 3.

The driving stem 10 can move in the slot 13 in the connecting rod 14 against the action of the spring 15, taking the support 4 with it, or conversely the connecting rod 14 can undergo displacement in relation to the stem 10, against the action of the spring, over a length equal to that of the slot 13. The spring 15 is nevertheless sufficiently strong to ensure that the step 10 will normally be held against one end of the slot 13, as shown in FIG. 1. As will be explained hereinafter, the spring is stretched only when one of these components 10 and 14 is secured in position while the other component is required to undergo displacement.

In accordance with one important aspect of the present invention, self-locking means hold the guide fingers in the advanced position against normal retracting forces exerted on the fingers by the tape moving thereover, and permit retracting movement of the fingers in response to excessive retracting forces exerted on the fingers during abnormal tape movement. Thus, in the illustrative embodiment the connecting rod 14 pivots on a pin 17 mounted near the periphery of a gear wheel 18 driven by a shaft 19. A stud 20, affixed on the opposite side of the wheel 18 from the pin 17, interacts with a stop 21 integral with the frame 9 to lock the wheel and thus the guiding device in an advanced position. The frame 9 also bears a second stop 22, to limit the travel of the support 4.

A description will be given of the operation of guiding the tape 2 around the drum 1, by reference to FIGS. 1, 2 and 3. Starting from the position shown in FIG. 1, and operating a press button, a motor which is not shown in the drawing rotates the gear wheel 18 counter-clockwise as shown by the arrow in FIG. 1. This wheel 18 drives the connecting rod 14 via the pin 17. Because the spring 15 keeps the stem 10 at the bottom of the slot 13, i.e., at the end of the slot closer to the gear wheel, the stem 10 follows the movement of the connecting rod 14 by sliding in the circular groove 11 (see also FIG. 4) of the frame 9, thereby driving the arm 12 and the support 4 counter-clockwise in a circular arc around the shaft 5. During this movement the guide finger 3 wraps the tape around the drum 1.

When the drive wheel 18 has turned through about a half revolution, the guide finger 3 has been moved to its advanced position, and the support 4 is brought to a standstill by the stop 22 (FIG. 2). At this point, the stud 20 on the drive wheel 18 is not yet resting against the stop 21, and the connecting rod 14 has not yet passed top dead center, which is the point of maximum advancement of the rod 14. The wheel 18 can continue to rotate against the bias of the spring 15, even though the support 4 is secured in position by the stop 22, due to the slot 13 in the connecting rod 14. That is, the stem 10 and slot 13 form a lost motion connection between the rod 14 and the arm 12. When the top dead center position of the connecting rod 14 has been passed, the support 4 is still held against the stop 22 by the spring 15 which is slightly relieved of its tension. The drive wheel 18 is stopped by engagement of the stud 20 and the stop 21 at a point slightly beyond the top dead center position of the rod 14, and the entire drive mechanism is then locked in both directions by the combined stops 21 and 22.

The gear wheel 18 likewise drives the gear wheel 18', which by a mechanism identical to that explained above drives the support 4' in a clockwise direction until the locked position shown in FIG. 2 is reached. Of course, the two gear wheels 18 and 18' are synchronized since one drives the other.

The magnetic tape 2 is now in its operative position contacting the drum 1 over an arc of 180° (FIG. 2). In this position the support 4 and the guide finger 3 are firmly locked against normal retracting forces exerted on the guide finger by the tape moving thereover. More particularly, advancing (counter-clockwise) movement of the support 4 is blocked by the stop 22, and retracting (clockwise) movement is blocked by the stop 21 because by clockwise forces on the support 4 tend to rotate the gear wheel 18 in the counter-clockwise direction which is blocked by the stud 20 and the stop 21. Consequently, an automatic locking or "self-locking" effect is obtained, owing to the fact that the gear wheel 18 is able to move the connecting rod 14 beyond its dead center, despite the fact that the support 4 is blocked by the stop 22, due to the lost motion connection provided by the spring 15 and the slot 13.

In keeping with the invention, the force of the spring 15 is such that the guide fingers 3 and 3' resist normal retracting forces exerted on the fingers by the tape moving thereover, but retract slightly in response to excessive retracting forces exerted on the fingers (in excess of the biasing force of the spring 15) during abnormal tape movement. Such abnormal conditions may occur, for example, during the winding or rapid rewinding of the tape 2, if the delivery reel is not correctly braked when the end of the tape is reached. In this case an abnormal force is exerted on the guide fingers 3 and 3' and might cause the tape 2 to break if the guide fingers were fixed. Thanks to the spring 15 and the slot 13 in the connecting rod 14, however, the supports 4 and 4' and their guide fingers 3 and 3' are able to retract over a distance proportional to the length of the slot 13, against the action of the spring 15, enabling a resilient slackening of the magnetic tape to take place.

When it is desired to remove the magnetic tape 2 from the drum 1, the drive wheel 18 is driven in the reverse or clockwise direction, thereby reversing the operation described above to return the guide fingers 3 and 3' to their retracted positions. Again, the lost motion connection between the rod 14 and the arm 12 permit the rod to be returned through its dead center, or point of maximum displacement, and then about a half revolution of the wheel 18 in the clockwise direction retracts the rod 14 to move the finger 3 and all the coupling elements to their retracted positions shown in FIG. 1.

One particular aspect of the invention resides in the shape of the supports 4 and 4' and also in their driving system, ensuring an ideal angle of inclination of the guide fingers 3 and 3' in relation to the drum 1. More specifically, the width of each support, its flattened shape and its three-point suspension make it possible, as will be explained in greater detail by reference to FIGS. 4–6, to maintain a perfectly horizontal position, both during the support displacement and when the tape 2 is in the operative position. Moreover, due to the presence of the arm 12, which maintains the shaft 5 and the stem 10 parallel to each other, nor distortion moment is exerted by the force of the connecting rod 14 on the support 4. If the stem 10 were to drive the support 4 without the arm 12, the stem 10 would be subjected to comparatively high stresses, tending to move the support 4 out of its horizontal position.

Figure 5:
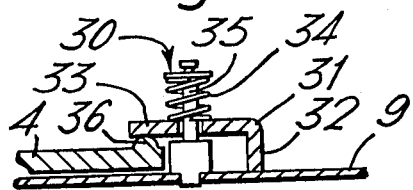
FIG. 5 is a section along the line V—V in FIG. 4.
Figure 6:
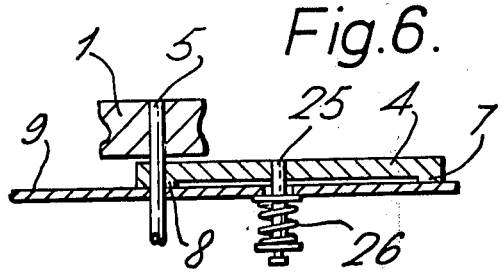
FIG. 6 is a section along the line VI—VI in FIG. 4.

FIGS. 4–6 show, in detail, the adjusting and regulating elements of one of the supports 4, 4' and its guide finger 3, 3'. Most of these elements have been omitted from FIGS. 1, 2 and 3, in order not to encumber those drawings with excessive detail, and for the same reason certain elements of FIGS. 1, 2 and 3 have been omitted from FIGS. 4, 5 and 6. FIG. 4 shows the support 4 in the advanced position. The support rests on the frame 9 of the apparatus on three feet 6, 7 and 8, of which two, i.e. 7 and 8, are situated on a line perpendicular to that portion of the path of the magnetic tape 2 which is situated between the guide finger 3 and a cartridge (not shown). The height of the foot 6 can be adjusted by means of a screw, so that the angle of inclination of the support 4 and thus of the guide finger 3 in relation to the frame can be easily regulated.

In order to ensure the contact of the three support feet 6, 7 and 8 with the frame 9, a resilient means is provided to urge the support 4 to rest tightly against the frame 9. Thus, the circular groove 11 in the frame is utilized to provide a second stem 25 integral with the support 4 and sliding in the groove. The action of a helical pressure spring coaxial with the step 25 ensures contact between the three support feet 6, 7 and 8 and the frame 9, avoiding all vertical play of the guide finger 3.

Referring to FIGS. 4 and 5, a blocking device 30 is situated on the frame 9 in the proximity of the drum 1, and serves to eliminate any possible tendency towards vertical play in the guide fingers and to prevent them from vibrating in any way. The device 30 includes an L-shaped claw 31 with two branches 32 and 33. The smaller branch 32 is held in contact with the frame 9 by means of a helical pressure spring 34 affixed to a stem 35 integral with the frame 9 and passing through the branch 33 of the claw 31. The support 4 includes a conical knob 36 which slides between the frame 9 and the branch 33, against the influence of the spring 34, when the support 4 reaches the advanced position. Needless to say, the head 36 can be flat if the end of the blade 33 has a conical portion on its lower surface. The device 30 enables the support 4 and the guide finger 3 to resist forces exerted by the magnetic tape on the guide finger and ensures that the support 4 will remain perfectly horizontal and immobile. This is very important because, as already described above, the slightest displacement of the guide finger, however limited, like the slightest vibration, will cause faulty reproduction or a faulty recording.

The guide assembly can also be combined with a switch to cause the guide fingers to return when the support 4 has to yield to any abnormal stress exerted by the magnetic tape.

The description of FIGS. 4, 5 and 6, relating to the support 4, is equally applicable to the support 4'.

Although the invention has been described by reference to an example particularly preferred, it goes without saying that this example is in no way limiting and that numerous modifications can be made thereto, without departing from the scope of the invention.

I claim as my invention:

1. In apparatus for positioning and guiding magnetic tape around the drum of a rotary head assembly in a recording and/or reproducing mechanism having at least two guide fingers for guiding the magnetic tape and mounted for movement between a retracted position where the guide fingers engage the magnetic tape in a self-contained cartridge, and an advanced position where the guide fingers dispose the tape along a predetermined helical path on the drum surface, the improvement comprising self-locking means for holding the guide fingers in the advanced position against normal retracting forces exerted on said fingers by the tape moving thereover, and means for permitting limited retracting movement of said fingers in response to excessive retracting forces exerted on said fingers during abnormal tape movement.

2. Apparatus as set forth in claim 1 which includes a pair of synchronized drive wheels for moving said guide fingers between the retracted and advanced positions, and a pair of coupling means interconnecting the drive wheels and the guide fingers, each coupling means including a connecting rod pivoted to one of said drive wheels so that a half revolution of the drive wheel in a first direction advances the connecting rod to move the corresponding guide finger to its advanced position and a half revolution of the drive wheel in the opposite direction retract the connecting rod to the corresponding guide finger to its retracted position, stop means associated with each drive wheel for stopping rotation of the wheel in said first direction slightly beyond the point of maximum advancement of said connecting rod so that any retracting forces exerted on said connecting rod by the guide finger are resisted by said stop means, thereby providing selflocking of the guide fingers.

3. Apparatus as set forth in claim 2 wherein a biased lost motion connection is provided between each connecting rod and the corresponding guide finger to permit limited retracting movement of the guide fingers in response to retracting forces exerted on said guide fingers in excess of the bias on the lost motion connection.

4. Apparatus as set forth in claim 3 which includes stop means associated with each guide finger for stopping advancing movement of the guide finger slightly before the point of maximum advancement of said connecting rod whereby said lost motion connection permits the corresponding drive wheel to continue to be rotated in said first direction to the point of maximum advancement of said connecting rod.

5. Apparatus as set forth in claim 3 wherein the bias on the lost motion connection holds the corresponding guide finger in the advanced position against normal retracting forces exerted on said finger by the tape moving thereover, but permits retracting movement of the guide finger relative to the connecting rod in response to excessive retracting forces exerted on said finger during abnormal tape movement.

6. Apparatus as set forth in claim 3 wherein said lost motion connection comprises a slot in said connecting rod, a pin coupled to the corresponding guide finger and extending into said slot to permit limited relative movement between said connecting rod and the corresponding guide finger, and a spring urging said pin toward one end of said slot.

7. Apparatus as set forth in claim 1 wherein each of said guide fingers in carried by a support member having three feet resting on a frame member, one of said feet being adjustable in height for regulating the angle of inclination of the guide fingers relative to said drum.

8. Apparatus as set forth in claim 7 which includes blocking means interacting with knobs on said support members to hold said support members in contact with a frame member when the guide fingers are in the advanced position, the interacting surfaces of said blocking means and knobs including a conical surface to enable said knobs to fit under said blocking means.

* * * * *